United States Patent [19]

Angle

[11] Patent Number: 5,099,648
[45] Date of Patent: Mar. 31, 1992

[54] HYDRAULIC AIR COMPRESSOR AND TURBINE APPARATUS

[76] Inventor: Lonnie L. Angle, 1951 E. Fairfield, Mesa, Ariz. 85203

[21] Appl. No.: 491,432

[22] Filed: Mar. 9, 1990

Related U.S. Application Data

[63] Continuation-in-part of Ser. No. 268,950, Nov. 8, 1988, abandoned.

[51] Int. Cl.$^5$ .............................................. F02G 3/00
[52] U.S. Cl. .................................. 60/726; 60/641.1; 60/682; 417/76; 417/150
[58] Field of Search .................. 417/65, 76, 150; 60/726, 650, 682, 641.1

[56] References Cited

U.S. PATENT DOCUMENTS

| | | | |
|---|---|---|---|
| 662,884 | 11/1900 | Starke | 417/150 |
| 892,772 | 7/1908 | Taylor | 417/150 |
| 1,000,345 | 8/1911 | Roed | 417/150 |
| 2,013,236 | 9/1935 | Dell | 417/77 |
| 2,861,737 | 11/1958 | Bowen | 417/150a |
| 4,278,405 | 7/1981 | Angle | 417/150 |
| 4,307,299 | 12/1981 | Norton | 290/52 |
| 4,462,205 | 7/1984 | Giles et al. | 60/39.02 |

Primary Examiner—Allen M. Ostrager
Attorney, Agent, or Firm—H. Gordon Shields

[57] ABSTRACT

Hydraulic air compressor and turbine apparatus includes a hydraulic air compressor having an air intake disposed above the water intake for entraining air in falling water, and the output of the hydraulic air compressor is used as a compressed air source for a turbine. The turbine apparatus includes a regenerator for heating the incoming compressed air output from the hydraulic air compressor. The hydraulic air compressor may include a pump for providing a flow of water for entraining and compressing air to provide a closed cycle system, and it may include an air pump or fan to increase the amount of air entrained in a given flow of water. Several different structures for negating a loss of water velocity are also disclosed, and several different turbine systems are disclosed.

18 Claims, 6 Drawing Sheets

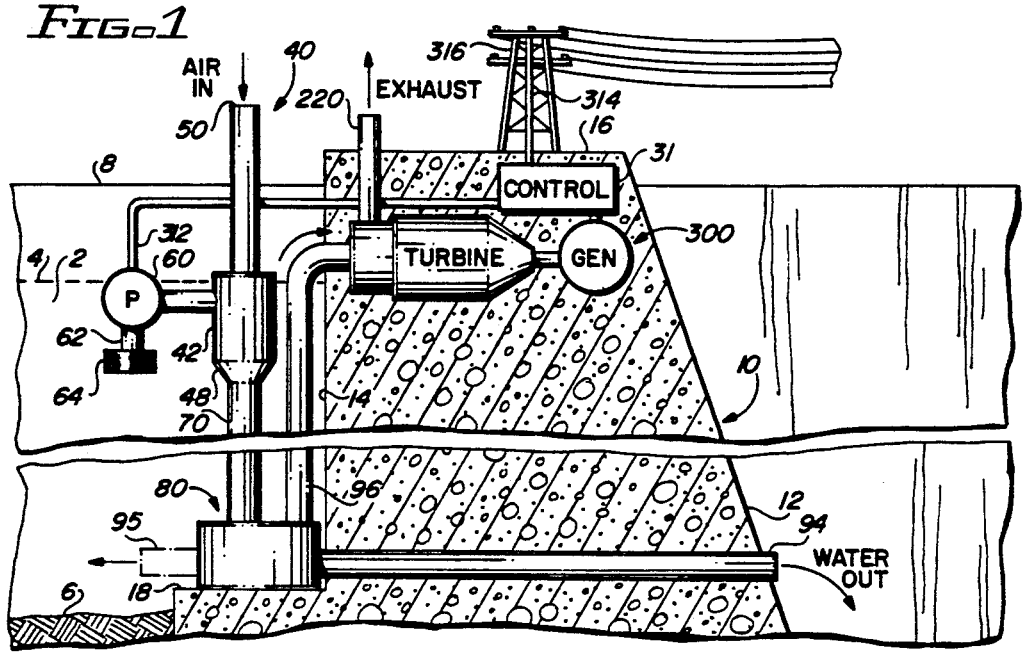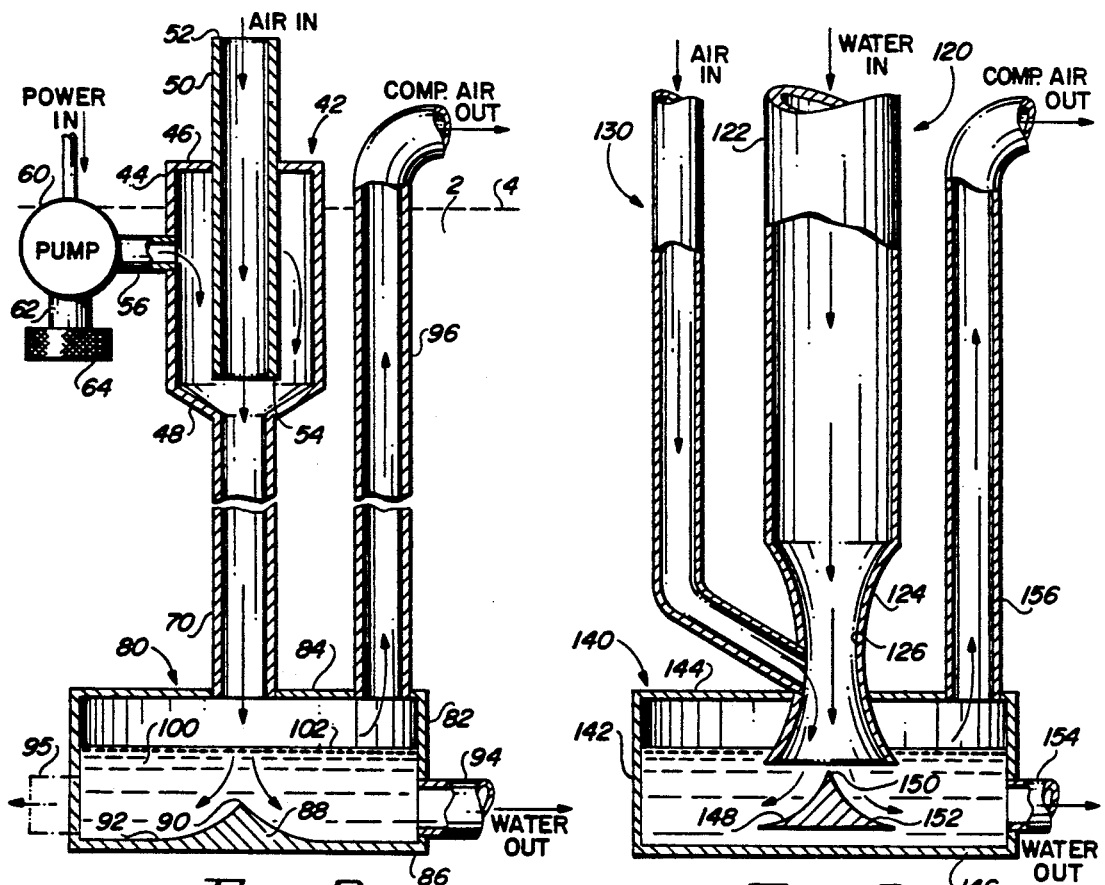

HYDRAULIC AIR COMPRESSOR AND TURBINE APPARATUS

CROSS REFERENCE TO RELATED APPLICATION

This application is a continuation-in-part application of copending application Ser. No. 07/268,950, filed Nov. 8, 1988, and now abandoned.

BACKGROUND OF THE INVENTION

1. Field of the Invention

This invention relates to hydraulic air compressors or compressed air storage systems and fuel fired turbines, and, more particularly, to hydraulic air compressors and/or compressed air storage systems for providing compressed air for fuel fired turbines.

2. Description of the Prior Art

U.S. Pat. No. 4,307,299 (Norton) discloses a hydraulic air compressor system providing compressed air to a fuel fired turbine. The apparatus disclosed is drawn to a hydraulic air compressor in combination with both a fuel fired turbine and a hydraulic generating system. The fuel fired turbine generator is discussed only in broad terms and is shown only schematically. The hydraulic air compressor is shown in more detail, and two different embodiments of the hydraulic air compressor are illustrated.

U.S. Pat. No. 4,462,205 (Giles et al) discloses a hydraulic air compressor utilized in a gas turbine system utilizing coal as the raw material. The coal is gasified, and the gas is used as the fuel for the turbine.

Hydraulic air compressors, by themselves, have been known for many years. Various embodiments of hydraulic air compressors are disclosed in the following U.S. Pat. Nos.: 199,819 (Frizell), 317,074 (Baloche et al), 383,429 (Arthur), 643,411 (Taylor), 682,811 (Paterson), 880,187 (Blakney), 885,301 (Siepermann et al), 1,057,961 (Heirich), 1,628,025 (Boving), and 4,278,405 (Angle).

It will be noted that all previous hydraulic air compressor patents have an entrainment head above the compressor head of the hydraulic air compressor, and which is used to flow air and water down to a separating chamber. No elevated entrainment head is required in this application. Water is drawn through or pumped to the eductor or down tube. This allows for the hydraulic air compressor to be placed before and above a dam, and not below the dam. More importantly, it allows a hydraulic air compressor to be placed in a hole, as in a lake or ocean, and it allows it to be powered totally by a pump for a closed cycle. It also allows the hydraulic air compressor to be used in conjunction with all previous art if additional air is required at the fuel-fired turbine, as shown schematically in U.S. Pat. No. 4,307,299 (Norton).

U.S. Pat. No. 2,010,823 (Noack) discloses a turbine engine in which an air fuel mix is exploded in a combustion chamber. Under low power conditions, additional compressed air is supplied from a central tank to provide minimum pressure and gas flow for combustion and for exhaust scavaging.

U.S. Pat. No. 2,115,644 (Modesse) discloses a compressed air supply for a turbine engine. A piston type compressor is utilized to provide compressed air.

U.S. Pat. No. 2,390,959 (Pfenninger) discloses a gas turbine system for utilizing a blower or compressor backed by an electric motor. When the turbine is operating under no load or light load conditions, the motor drives the compressor to provide air flow to the combustion chamber.

U.S. Pat. No. 2,650,060 (Stalker) discloses a gas turbine system in which a small gas turbine is used as a starter for a larger turbine. The small turbine is in turn started by an electric motor which drives a compressor. A compressor in turn provides compressed air for the small turbine.

U.S. Pat. No. 2,941,790 (Compton et al) discloses a gas turbine system which utilizes a compressed air tank. The compressed air tank is used to provide compressed air for starting the turbine. The compressed air is also used for combustion purposes. The compressed air, exhausted from the compressor portion of the system, is also directed to the combustion chambers. After the turbine is started, the compressed air tank is recharged from the turbine compressor. The compressed air charged is then maintained for the next engine start.

U.S. Pat. No. 4,312,179 (Zaugg) discloses a gas turbine power plant which utilizes a compressed air storage tank. The compressed air storage tank provides additional compressed air for operating the turbine during periods of high load and is replenished by the turbine compressor as loads allow. The compressed air storage tank is apparently relatively large, and is referred to in the patent as an air reserve cell. This would appear to imply that the compressed air storage is relatively large, and not merely a conventional "tank" such as discussed in the above-cited patents.

SUMMARY OF THE INVENTION

The invention described and claimed herein includes a hydraulic air compressor having an air source disposed above a water source, and the compressed air output of the hydraulic air compressor is utilized as the compressed air in, for example, a fuel fired turbine.

Among the objects of the present invention are the following:

To provide new and useful hydraulic air compressor and fuel fired turbine apparatus;

To provide new and useful hydraulic air compressor apparatus for providing compressed air for a fuel fired turbine;

To provide new and useful fuel fired turbine apparatus utilizing compressed air from a hydraulic air compressor;

To provide new and useful fuel fired turbine apparatus utilizing compressed air from compressed air storage chambers;

To provide new and useful hydraulic air compressor apparatus in which an air inlet is disposed above a water inlet;

To provide new and useful hydraulic air compressor apparatus in which water is pumped to a eductor for entraining air;

To provide new and useful fuel fired turbine apparatus utilizing compressed air from a hydraulic air compressor in place of a compressor stage; and To provide new and useful hydraulic air compressor and fuel fired turbine apparatus utilizing a regenerator for increasing the temperature of the compressed air to the turbine and for reducing the exhaust temperature of the turbine.

BRIEF DESCRIPTION OF THE DRAWING

FIG. 1 is a schematic representation of the apparatus of the present invention in one use environment.

FIG. 2 is a side view in partial section of a portion of the apparatus of FIG. 1.

FIG. 3 is a side view in partial section of an alternate embodiment of the apparatus of FIG. 2.

DESCRIPTION OF THE PREFERRED EMBODIMENT

Figure 4:
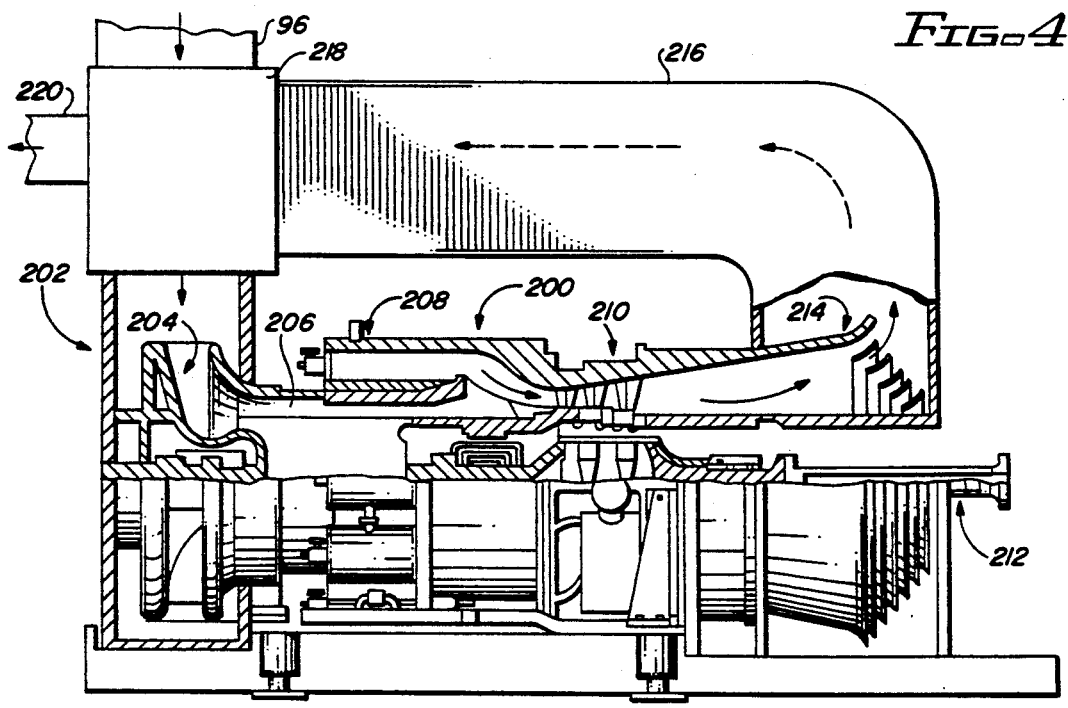
FIG. 4 is a side view schematically representing a portion of the apparatus of the present invention.

FIG. 1 is a schematic representation of the apparatus of the present invention in a use environment. The use environment includes a lake 2 which has a top surface 4 and a bottom 6. The lake is bounded by a lake shore 8 and a dam 10.

The dam 10 includes a front face 12, a rear face 14, and a top 16. At the bottom rear of the dam 10 is a rear bottom shelf 18. A portion of the apparatus of the present invention is disposed on the rear bottom shelf 18.

The apparatus of the present invention, in the environment of the lake 2, includes hydraulic compressor apparatus 40 and a turbine 200. The hydraulic compressor apparatus 40 of FIG. 1 is shown in detail in FIG. 2. FIG. 2 is a side view in partial section of the hydraulic compressor 40 of FIG. 1. For the following discussion, reference will primarily be made to FIGS. 1 and 2.

The hydraulic compressor apparatus 40 includes an eductor housing 42 which includes a cylinder 44 closed by a top plate 46, and a tapered bottom 48.

Extending downwardly through the top plate 46 is an air intake pipe 50. The air intake pipe 50 includes a top 52 which is above the top surface 4 of the lake 2. The air intake pipe 50 also includes a bottom 54 within the cylinder 44 and adjacent to the downwardly and inwardly tapering bottom portion 48.

Adjacent to the cylinder 44 is a pump 60. It will be noted that the pump 60 is disposed within the lake 2. The pump 60 is connected to the cylinder 44 by a conduit or water pipe 56. The water pipe 56 extends through the cylinder 44 downwardly from the top plate 46, and above the tapered portion 48, and accordingly also above the bottom 54 of the air intake pipe 50.

Water flows to the pump 60 through a water intake pipe 62, which extends downwardly from the pump 60. The water intake pipe 60 is closed by a filter 64 on its lower end. Water is pumped through the filter 64 and through the water intake pipe 62. The pumped water then flows through the water pipe 56 into the cylinder 44 of the eductor housing 42. The water flowing through the pipe 46 and into the cylinder 44 flows downwardly within the cylinder 44 and out of the housing 42, through the inwardly tapering bottom portion 48, and into a down pipe 70.

The water flowing by the bottom 54 of the air intake pipe 50 within the cylinder 44 causes air to flow downwardly into the pipe 50. The water flowing downwardly mixes with the air from the pipe 50 in the tapered portion 48. The tapered portion 48 essentially acts as a venturi to help pull the air into the stream of water, thus entraining the air into the falling water. The falling water and air mixture causes the air entrained in the water to be compressed as the air and water flow downwardly in the down pipe 70.

Disposed on the bottom shelf 18 is a separator 80. The separator 80 includes a generally cylindrical housing 82 closed by a top plate 82 and a bottom plate 86. The down pipe 70 extends through the top plate 84.

Within the housing 82, and adjacent to the bottom 86, is a separator cone 88. The separator cone 88 is disposed generally axially aligned with the down pipe 70. The water and air falling or flowing in the down pipe 70 flows into the cylinder 82 and onto the cone 88. The cone 88 tapers outwardly from a central point 90. Away from the point 90 of the cone 88 is an outwardly tapering portion 92 which gradually becomes flat and joins the bottom 86 of the cylinder 82. As the water and air flows onto the cone 88, and outwardly from the point 90, the entrained air separates from the water and rises to the top of the cylinder 82. In FIG. 2, water flowing downwardly into the cylinder 82 is indicated by reference number 100, and the top of the water 100 is indicated by reference numeral 102.

The water 100 flows out of the cylinder 82 through a water out pipe 94. As indicated in FIG. 1, the water 100 flows out of the pipe 94 outwardly from the front face 12 of the dam 10.

It will be noted that the water 100 need not be discharged outwardly through the dam 10. Rather, the water 100 may be returned to the lake 2 by a pipe 95, shown in phantom. When the water 100 is returned to the lake 2 through the pipe 95, the pump 60 is required. When the water 100 is discharged through the dam 10 by the pipe 94, the pump 60 is not required. In the latter case, the lake water will flow naturally into the eductor 42.

The compressed air, separated from the water 100, flows upwardly through a compressed air pipe 96 from the separator 80. The compressed air pipe 96 extends to the turbine 100.

An alternate embodiment of the hydraulic air compressor apparatus 40 is illustrated in FIG. 3. FIG. 3 is a side view in partial section of hydraulic air compressor apparatus 120. The hydraulic air compressor apparatus 120 of FIG. 3 differs substantially from the hydraulic air compressor 40 of FIGS. 1 and 2.

Hydraulic air compressor apparatus 120 includes three separate pipes extending downwardly to a separator chamber 140. The three separate pipes include a water intake pipe 122, an air intake pipe 130, and a compressed air pipe 156.

The water intake pipe 122 includes a venturi 124 adjacent to the separator 140. The venturi 124 includes a throat 126. The air intake pipe 130 is connected to the water intake pipe 122 at the throat 126 of the venturi 124.

In hydraulic air compressor apparatus 120, the water moves downwardly in the water intake pipe 122 separately from the air. The air moves downwardly in the air intake pipe 130. The air and the water do not mix until the air joins the water flow at the throat 126 of the venturi 124. Accordingly, the air is not entrained in the water until it has fallen virtually all the way to the separator 140.

The separator 140 includes a cylindrical housing 142 closed by a top plate 144 and a bottom plate 146. The lower portion of the venturi 124, or the portion of the venturi 124 below the throat 126, extends through the top plate 144. Within the cylinder 142, the venturi 124 flares outwardly. The venturi 124 terminates above a separator cone 148. The separator cone 148 includes a top point 150 and a downwardly and outwardly flaring portion 152. The downwardly and outwardly flaring portion 152 extends outwardly from the point 150. The point 150 is coaxially aligned with the venturi 124 and the pipe 122.

Water flowing downwardly in the pipe 122, and the entrained air from the pipe 130, flows onto the separator 148. Water, separated from the air, flows out of the housing 142 through a water out pipe 154. Compressed air, separated from the water, flows upwardly through the pipe 156. The pipe 156 extends also to the turbine 200, or to similar apparatus.

FIG. 4 is a side view schematically representing the turbine 200 and elements associated therewith. For the following discussion, reference will primarily be made to FIGS. 1 and 4.

The cold compressed air, flowing through the pipe 96, flows to a heat exchanger 218 where it receives heat from exhaust gases from the turbine 200. The compressed air, heated in the heat exchanger 218, flows into an air intake housing 202 of the turbine 200. The air intake housing 202 is appropriately connected to the heat exchanger 218. Within the air intake housing 202 is a plurality of air inlet guides 204 of the turbine 200. The air inlet guides 204 cause the hot compressed air flowing downwardly from the pipe 96 and through the heat exchanger 218 to change direction and to flow generally horizontally within an air inlet chamber 206 of the turbine 200. From the air inlet chamber 206, the air again changes direction, and flows through a combustion section 208 of the turbine 200. It will be noted that the turbine 200 does not include a compressor section. Rather, the compressed air from the hydraulic air compressor apparatus 40 is used in the turbine 200 in place of a compressor section.

In the combustion section 208, the hot, compressed air is appropriately combined with fuel, and combustion takes place. From the combustion section 208, the hot gases from the combustion section flow to a turbine section 210. The turbine section 210 is appropriately connected to an output shaft 212. Rotation of the turbine section 210, from the hot gases flowing from the combustion section 208, causes rotation of the turbine section 210 and accordingly of the output shaft 212.

The gases flowing from the turbine section 210 flow to an exhaust section 214. The exhaust section 214 is in turn connected to an exhaust duct 216. The exhaust duct 216 extends from the exhaust section 214 to the heat exchanger 218. From the heat exchanger 218, the exhaust gases, cooled by the exchange of heat with the cold air flowing through the pipe 96, flows outwardly through an exhaust pipe or conduit 220, and the gases are appropriately vented to the atmosphere, etc., from the exhaust pipe 220.

The output shaft 212 is appropriately connected to a generator 300. Electricity from the generator 300 is controlled by a control section 310. The control section 310, for purposes of the present invention, divides the electricity into two portions, a portion of which flows through electrical conduits 312 to power the pump 60, and other equipment necessary to support the system or cycle. The remaining electrical energy flows through an electrical conduit 314 to distribution lines 316, for appropriate distribution in an electrical grid, or the like.

From the above discussion, it will be understood that hydraulic air compressor apparatus 40 produces compressed air for the turbine 200. The turbine 200 in turn provides energy from combustion, utilizing the compressed air, to power a generator 300. A portion of the electrical energy generated is utilized by the pump 60 to provide water for the hydraulic compressor 40. The remaining electrical energy is appropriately distributed, as desired.

Figure 5:
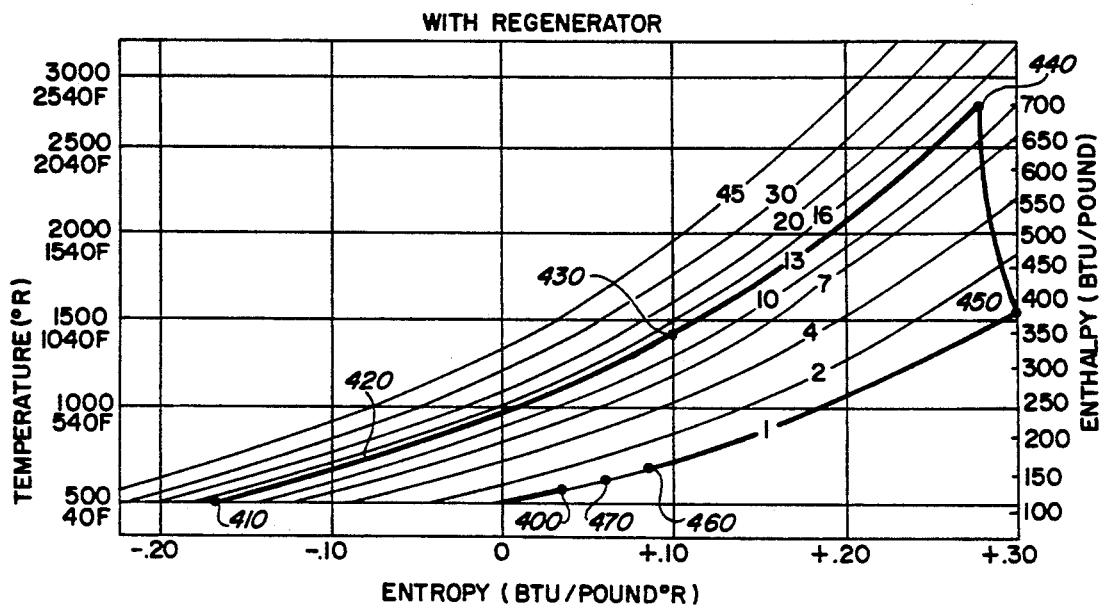
FIG. 5 is a chart illustrating the thermodynamic cycle in terms of entropy and enthalpy of the apparatus of FIG. 4.

FIG. 5 is a T-S or entropy-enthalpy diagram illustrating the thermodynamic characteristics or cycle of the apparatus of FIG. 4. The horizontal scale in FIG. 5 is entropy in BTUs per pound per degree Rankine. The left vertical scale is in degrees Rankine, with degrees Fahrenheit indicated beneath the Rankine temperature. The right vertical scale is enthalpy in BTUs per pound. The curves indicate the compression of the gas and the fuel, during the operation of the apparatus of the present invention. For the following discussion, reference will be made primarily to FIG. 5, but reference may also be helpful to FIGS. 1 and perhaps 2 and 4.

A point 400 on the chart refers to atmospheric conditions, or to the input conditions of the air at the intake of the hydraulic air compressor apparatus 42. The air is compressed essentially isothermally between point 400 and a point 410. Point 410 respesents the outlet of the hydraulic air compressor apparatus 40, or essentially the air flowing in the air output pipe or conduit 96. Point 410 represents the air flowing into the heat exchanger 218 of the turbine apparatus 200.

The compressed air flowing through the heat exchanger 218, which is essentially a regenerator, follows a curve 420 from point 410 to a point 430. Point 430 represents input of the compressed and heated air flowing into the combustion stage 208 of the compressor 200. With the combustion processes taking place, the graph or curve 420 continues upwardly to a point 440. The point 440 indicates the condition of the heated air at inlet of the turbine 210.

It will be noted that the air at atmospheric pressure, or at point 400, is essentially isothermally compressed between point 400 and point 410. The compressed air is then heated between point 410 and point 440. Between point 410 and point 430, the heating of the compressed air is through regeneration by the heat exchanger 218. From point 430 to point 440 the increased heat is the result of combustion in the combustion stage 208 by the adding of fuel to the compressed air and by the combustion of the fuel with the air.

It will be noted that any type of fuel may be used by the turbine apparatus 200. If natural gas or any other essentially sulfur-free fuel is used, problems associated with sulfur dioxide are generally not present.

From point 440, which is the point of maximum enthalpy, the enthalpy decreases to a point 450 in the turbine stage 210. Between point 450 and point 460 represent the exhaust stage of the turbine apparatus, with the accompanying release of heat, and with a substantial amount of the heat being utilized in the regeneration process. The balance of the heat loss, or the decrease in enthalpy being due to the exhausting of the gases to the atomosphere.

It will be noted that if natural gas or any other essentially sulfur-free fuel is utilized, the release point to the atmosphere will be at a point 470 rather than a point 460. The point 460 is the release point when sulfur laden fuel is used for combustion.

Figure 7:
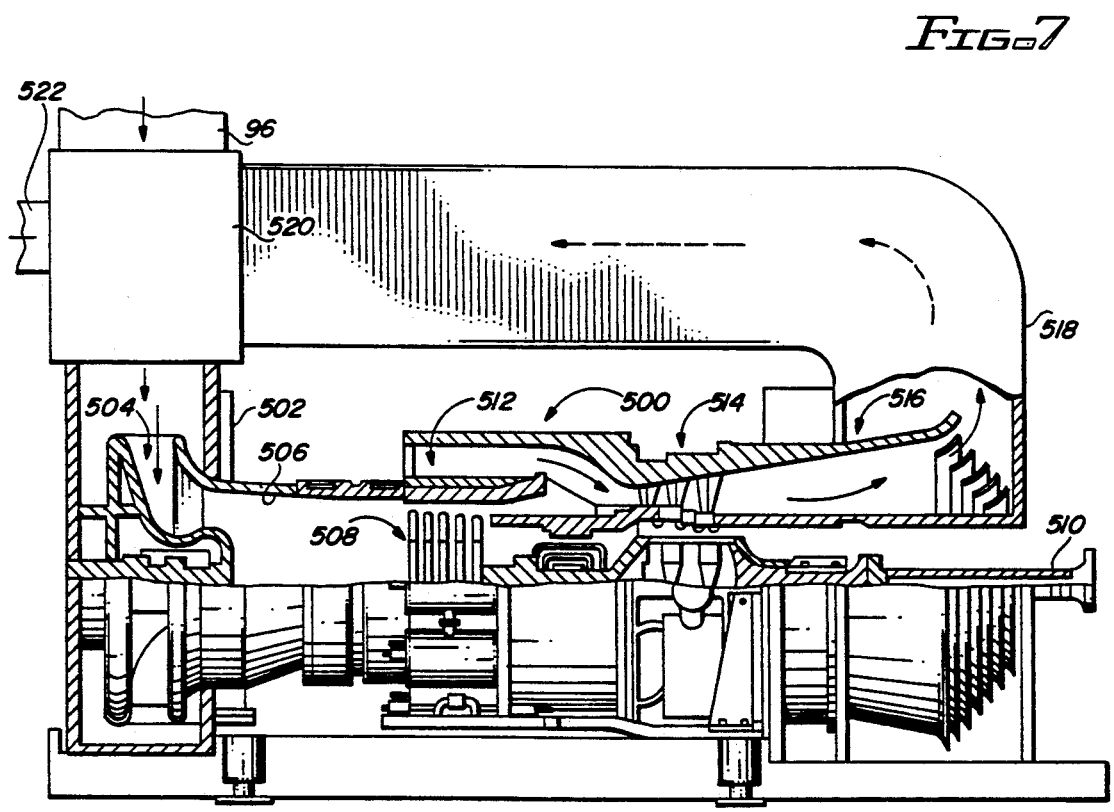
FIG. 7 is a schematic side view of the apparatus of FIG. 6.
Figure 6:
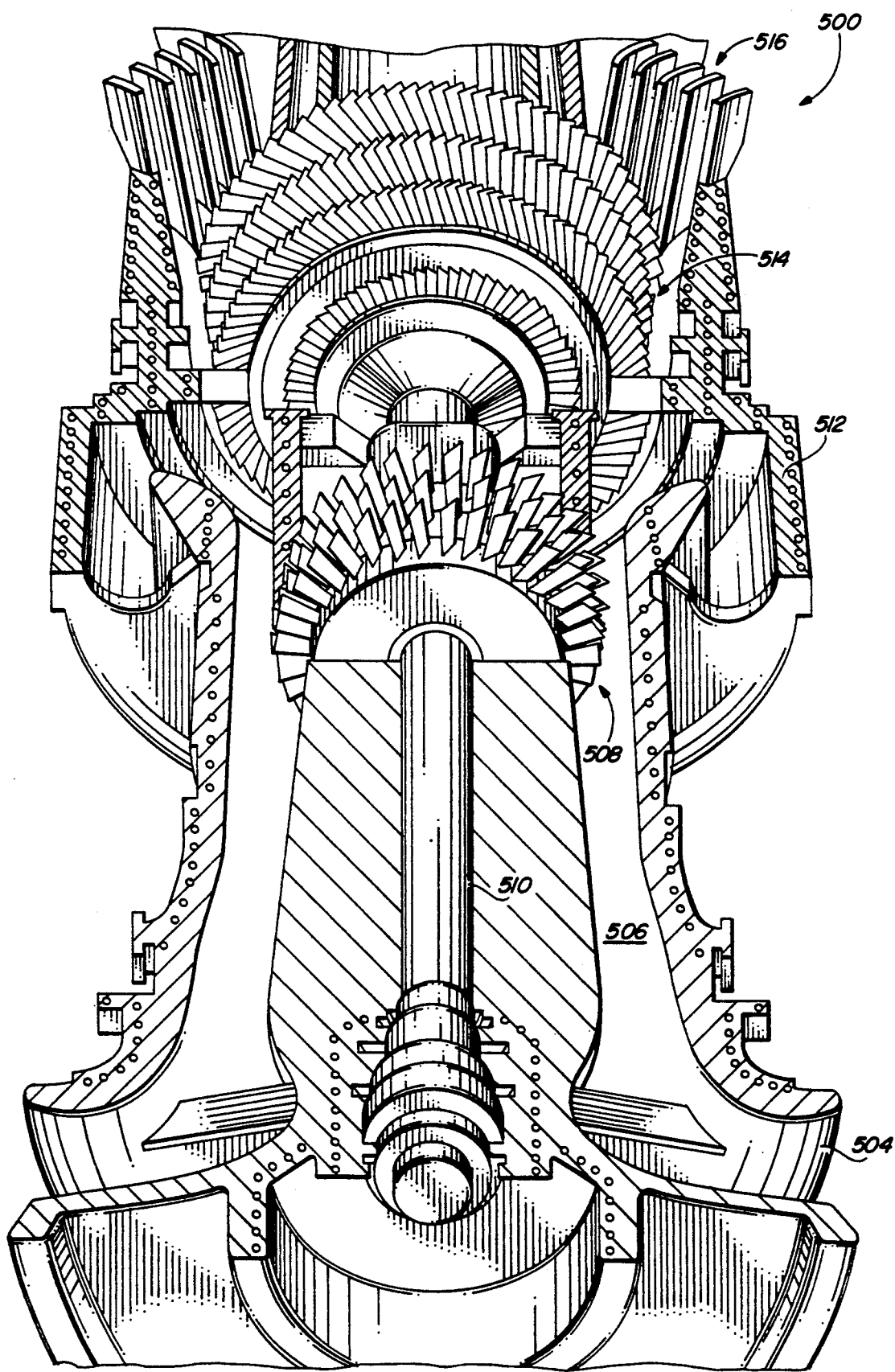
FIG. 6 is a top perspective view of an alternate embodiment of the apparatus of FIG. 4.

FIG. 6 is a top perspective view of an alternate turbine apparatus 500, usable with the hydraulic compressor apparatus of the present invention. FIG. 7 is a side schematic view of the apparatus of FIG. 6. The substantive difference between the turbine apparatus 200 of FIG. 4 and the turbine apparatus 500 of FIGS. 6 and 7 lies in a compressor portion. While the turbine 200 does not include a compressor section, the turbine 500 does include a compressor section.

The turbine apparatus 500 includes an air inlet or intake housing 502 and air inlet guides 504 which receive compressed air from heat exchanger 520 and air intake housing 502, illustrated in FIG. 6 From the air inlet guides 504, the heated, compressed air flows through air inlet chamber 506 and through a compressor stage 508. The compressor stage 508 is connected to a shaft 510, which is common with a turbine section 514.

From the compressor stage 508, where the heated and compressed air from the heat exchanger 520 is further compressed to increase the pressure above that which is introduced into the air inlet chaber 506. From the compressor stage 508, the heated and further compressed air then flows to a combustion section 512. From the combustion section 512, hot gases flow to the turbine section 514. As indicated above, both the compressor stage 508 and the turbine section 514 are connected to the shaft 510. The shaft 510 accordingly comprise an output shaft which is in turn connected to a generator, such as the generator 300 of FIG. 1.

From the turbine section 514, the hot gases flow through an exhaust section 516 and thence to an exhaust duct 518.

If the extent of pressure available from the hydraulic air compressor apparatus 40, or any variation thereof, is not sufficient, of course, then a compressor stage or stages of some type may be necessary to provide air of sufficient pressure for efficient power production. In the turbine apparatus 200, the output of the hydraulic air compressor is sufficient for power production. In turbine apparatus 500, a single or multiple compression stage, or further compression, of the incoming air is accomplished by the compressor section 508. The compressor section, or compressor stage 508, obviously utilizes a portion of the output from the turbine section 514 for the compression, as is well known and understood in the art. Nevertheless, the net power output from the turbine apparatus 500 is greater than, or is sufficient to provide a net gain over, the prior art, even when a poition of the electrical energy is fed back to a pump and auxilary equipment, if such is necessary, as discussed above.

Figure 8:
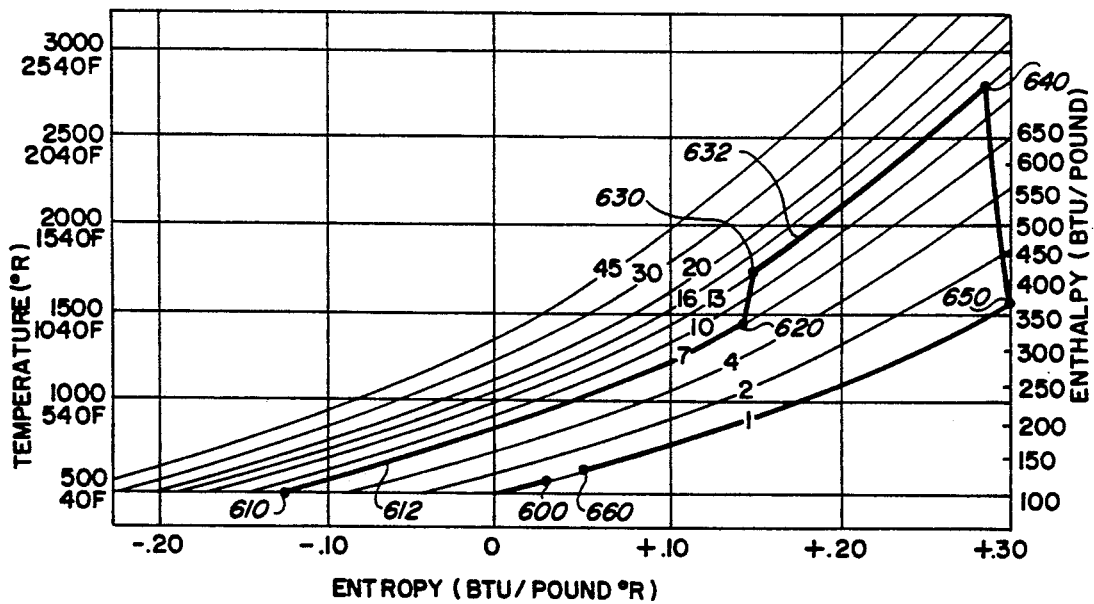
FIG. 8 is a chart illustrating the thermodynamic cycle in terms of entropy and enthalpy of the apparatus of FIGS. 6 and 7.

FIG. 8 is a T-S or entropy-enthalphy diagram illustrating the thermodynamic characteristics or cycle of the apparatus of FIGS. 6 and 7. The horizontal scale in FIG. 8 is entropy BTUs per pound per degree Rankine. The left vertical scale is in degrees Rankine, with degrees Fahrenheit indicated beneath the Rankine temperature. The right vertical scale is enthalpy BTUs per pound. The curves indicate the compression of the gas and the fuel during the operation of the apparatus of FIGS. 6 and 7. For the following discussion, reference will be made primary to FIGS. 6 and 7, but reference to FIG. 1 may also be helpful.

A point 600 on the chart refers to atmospheric conditions, or to the input conditions of the air at the intake of the hydraulic air compressor apparatus 42. The air is compressed essentially isothermally between point 600 and a point 610. Point 610 respresents the outlet of the hydraulic air compressor apparatus 40, or essentially the air flowing in the air output pipe or conduit 96.

The compressed air flowing through the heat exchanger 520, which is essentially a regenerator, follows a curve 612 from the point 610 to a point 620.

In the compressor stage 508 the air is compressed from the initial seven atmospheres of pressure indicated by the curve 612. Point 610 is on the curve 612. The compressor 508 further compresses the air to about thirteen atmospheres of pressure, indicated by point 630 on a curve 632.

Point 630 represents input of the compressed and heated air flowing into the combustion stage 512 of the turbine 500. With the combustion processes taking place, the graph or curve 632 continues upwardly to a point 640. The point 640 indicates the condition of the heated air at the inlet of the turbine section 514.

It will be noted that the air at at atmospheric pressure, or at point 600, is essentialy isothermally compressed between point 600 and point 610. The compressed air is then further compressed from seven atmospheres to thirteen atmospheres by the compressor 508. The curve 632 comprises the thirteen atmospheres of pressure curve. Between point 620 and point 630, the heating of the compressed air is through regeneration by the heat exchanger 520. From point 630 to point 640 the increased heat is the result of the combustion in the combustion stage 512 by the adding of fuel to the compressed air and by the combustion of the fuel with the air.

From point 640, which is the point of maximum enthalpy, the enthalpy decreases to a point 650 in the turbine stage 514. Between point 650 and a point 660 represents the exhaust stage of the turbine apparatus 500, with the accompanying release of heat. A substantial amount of the heat is utilized in the regeneration process, with the balance of heat loss due to exhausting the gases to the atmosphere.

Figure 9:
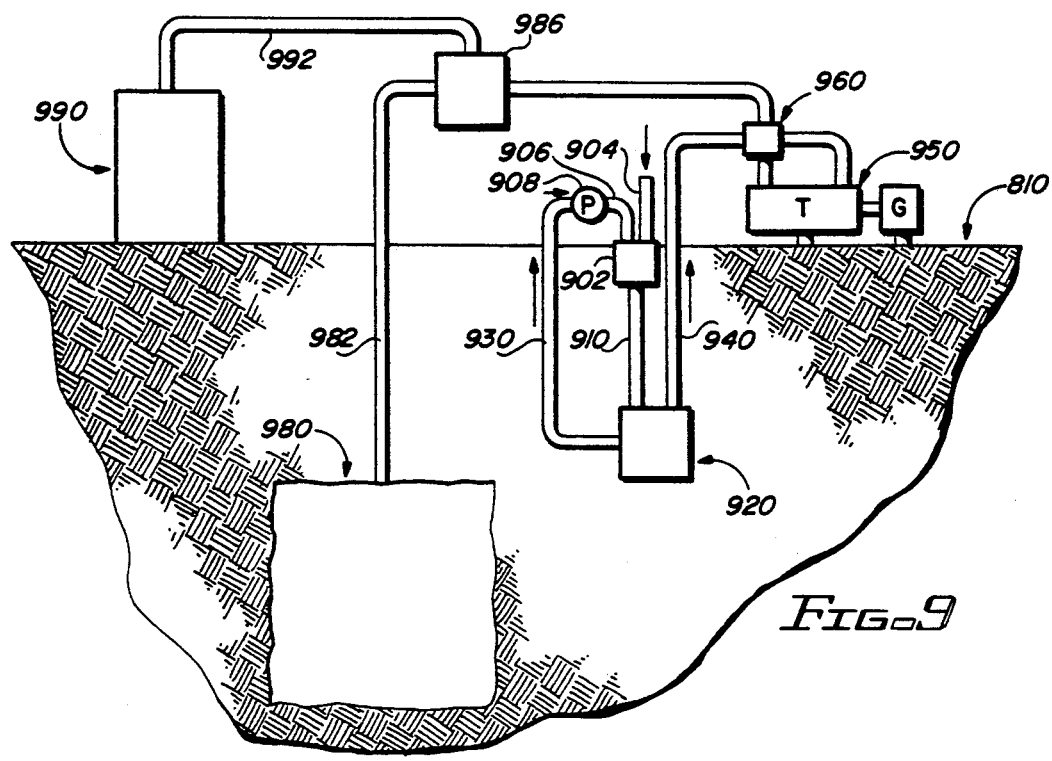
FIG. 9 is a schematic diagram illustrating the use of a compressed air facility with the apparatus of the present invention.

FIG. 9 is a schematic representation of an alternate embodiment of the apparatus of the present invention, with a hydraulic air compressor 900 schematically illustrated in conjunction with ground 810, and a fuel fired turbine 950. The fuel fired turbine 950 is disposed on the ground 810. The hydraulic air compressor 900 includes an eductor 902, and the eductor 902 is connected to an air intake 904 and a water intake 906. From the eductor 902, a pipe or conduit 910 extends downwardly to a separator chamber 920. Extending from the separator chamber 920 is a water pipe 930 and a compressed air pipe 940. The compressed air pipe 940 extends to the turbine 950, or, more specifically, to a heat exchanger or regenerator 960 which utilizes the hot exhaust gases from the turbine 950 to heat the air from the hydraulic air compressor 900.

The hydraulic air compressor 900 is schematically represented, and its source of water may be any appropriate water source, as from a river, a lake, a canal, or the like. The source of the water is usually be higher than the discharge elevation of the water discharge pipe 930. If desired, the water intake pipe 906 may be connected to a pump for providing a flow of water to the eductor 902. The water flowing upwardly in the pipe 930 may be reused by a pump and the system or apparatus may accordingly operate on an essentially closed water cycle.

Compressed air for the turbine 950 may also be provided from a compressed air storage facility 980. The compressed air storage facility 980 may be an underground cavern, mine, or the like.

While storing compressed air in an underground facility, such as an abandoned mine of the like, may be advantageous in many respects, such facility may not be practical. When underground storage facilities, as discussed above, are not readily available, compressed air may also be stored in above ground storage tanks, such as a tank 990.

From compressed air storage facilities, such as the underground facility 980 or above ground tank 990, compresssed air pipes, such as the pipes 982 or 992, respectively, extend to an expander element 986. The expander element 986 simply reduces the air pressure of the compressed air stored in either the underground facility 980 or the above ground facility 990 to an appropriate pressure usable by the turbine 950. The expander or pressure reducer element 986 may be any appropriate element, well known and understood in the art. For example, the expander or pressure reducer facility 986 may be nothing more than a valve, or it may be an interim element which derives work from the compressed air and then which discharges the air downstream from the work at the appropriate pressure for the turbine apparatus 950.

Figure 10:
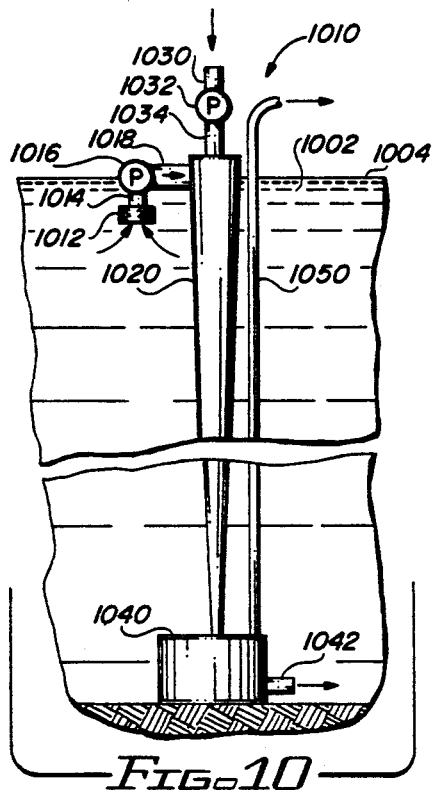
FIG. 10 is a schematic representation of another alternate embodiment of a hydraulic compressor.

FIG. 10 is a side schematic representation of a hydraulic compressor apparatus 1010 which is an alternate embodiment of the hydraulic air compressor apparatus disclosed above. The hydraulic air compressor apparatus 1010 is disposed within a body of water 1002. The body of water 1002 includes a top sureface 1004.

The hydraulic air compressor apparatus 1010 includes a water filter 1012 disposed downwardly within the body of water 1002 and below the top surface 1004. A water intake pipe or conduit 1014 extends from the filter 1012 to a pump 1016. From the pump 1016, a pipe or conduit 1018 extends to a tapered shaft 1020.

Also connected to the tapered shaft 1020 is an air intake conduit 1030. The air intake conduit 1030 extends to an air pump or fan 1032, and a conduit 1034 extends from the pump or fan 1032 to be tapered shaft 1020.

It will be noted that there is both a water pump 1016 and an air pump or fan 1032 to provide water and air for the tapered shaft 1020.

One of the problems with hydraulic air compressors of the prior art is a decrease in velocity of the water downwardly in the pipe as the air is compressed. As the air is compressed, the volume of the air decreases, and the decrease in the volume of air must be taken up within the down tube by water. The only way that the water can take up the excess volume is by decreasing velocity. Accordingly, all of the prior art hydraulic air compressors, including the hydraulic air compressor 40 of FIG. 1, has the problem of the decreasing velocity of the water as the water flows downwardly due to the decrease in volume of the air as the air is compressed. The hydraulic air compressor 120 of FIG. 3 does not have that problen since the air is not entrained in the water as the water falls downwardly. Since the water and air do not come together until adjacent to the separator chamber 140, the water falls downwardly in the pipe or tube 122 without the decrease in velocity caused by the decreasing volume of the air.

Having a tapered down tube or pipe, such as the tapered pipe 1020, compensates for the decrease in the volume of the air as the air is compressed and there is accordingly no decrease in the velocity of the water as it falls through the tube or pipe 1020.

At the lower end of the tapered pipe or conduit 1020, there is a separator chamber 1040. Water flows out of the separator chamber 1040 through a waterout pipe 1042. The water is returned to the body of water 1002 through the pipe 1042.

Compressed air separated from the water in the separator chamber 1040 flows upwardly in a pipe 1050. The compressed air flowing upwardly in the pipe 1050 may be used as desired, as in the turbine apparatus of FIGS. 1 and 4, FIGS. 6 and 7, FIG. 9, etc. The efficiency of the hydraulic air compressor apparatus 1010 is substantially increased over the apparatus with a constant diameter downshaft due to the tapered configuration of the pipe or shaft 1020 so that there is no decrease in the velocity of the water as it falls downwardly to the chamber 1040.

It will be noted that, since the water is discharged from the separator chamber 1040 directly into the water body 1002 through the pipe 1042, the pump 1016 is required to provide water. As has been alluded to above, regardless of the utilization of the compressed air from the pipe 1050, there is a net gain in energy from the hydraulic air compressor apparatus 1010 even when the pump 1016 is used because the efficiency of the apparatus is increased by a net gain of energy due to the increased efficiency over the energy required to power the pump 1016, and even to power the air pump or fan 1032.

Figure 11:
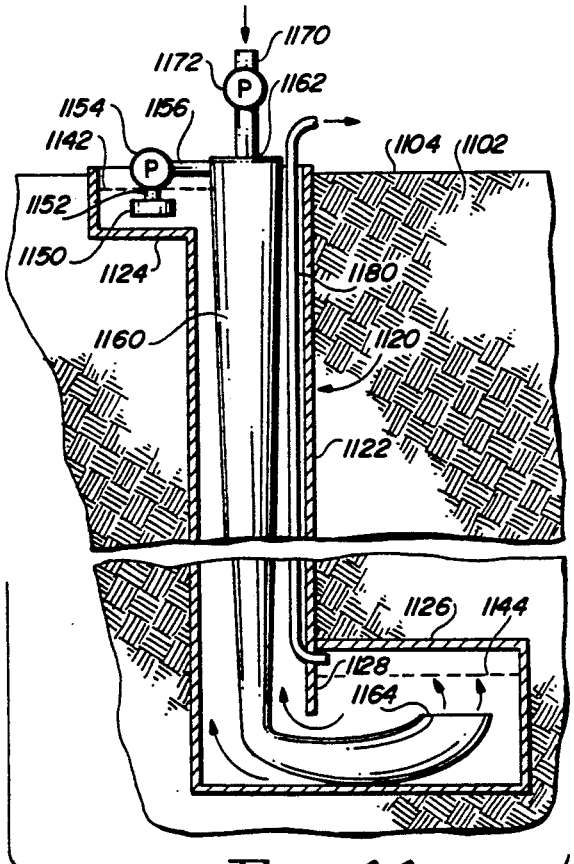
FIG. 11 is a schematic representation of an alternate embodiment of the apparatus of FIG. 10.

An alternate embodiment of the hydraulic air compressor 1010 is illustrated in FIG. 11. FIG. 11 is a side schematic representation of hydraulic air compressor apparatus 1110 which is disposed within a hole in the ground rather than in a body of water. In FIG. 11, ground is respresented by reference numeral 1102. The ground 1102 includes a top surface 1104. The hydraulic air compressor 1110 extends downwardly into the ground 1102 from the top surface 1104.

The hydraulic air compressor apparatus 1110 includes a housing 1120 which extends into the ground 1102. The housing 1120 includes a shaft 1122, and there is a basin 1124 at the top of the shaft 1122, and a separator chamber 1126 at the bottom of the shaft 1122. A partition 1128 separates the chamber 1126 from the shaft 1122.

Water is disposed within the shaft 1122, the basin 1124, and the separator chamber 1126. Within the basin 1124, the surface of the water is designated by reference numeral 1142. Within the chamber 1126, the surface of the water is designated by reference numeral 1144.

Below the surface of the water 1142 in the basin 24 there is a water intake filter 1150. The filter 1150 is connected to a pump 1154 by a pipe 1152. Extending from the pump 1154 is a pipe 1156. The pipe 1156 comprises a conduit through which water is pumped from the basin 1124 to a tapered pipe 1160. The tapered pipe 1160 is disposed within the shaft 1122.

The tapered pipe 1160 includes a top end 1162 and an outlet 1164. The outlet 1164 is disposed within the separator chamber 1126.

Water pumped from the basin 1124 flows into the tapered pipe 1160 adjacent to its top end 1162. At the same time, air is pumped into the top 1162 of the tapered pipe 1160 to be entrained in the water flowing from the pump 1154. Air flows into the pipe 1160 from an air intake pipe 1170, a pump or fan 1172, and a conduit 1174. The conduit 1174 extends from the pump or fan 1172 to the top 1162 of the pipe 1160.

As with the hydraulic air compressor apparatus 1110, a pump or fan is used to help push air into the tapered pipe to increase the efficiency of the hydraulic air compressor apparatus. The eductor elements for both the hydraulic air compressor 1010 and 1110 have been omitted, since they are well known and understood in the art and have been illustrated above in conjuction with FIG. 2. Similar types of eductor apparatus may be used, or any other appropriate apparatus may also be used for entraining the air in the flowing water.

Again, the pipe 1160 is tapered to compensate for the decrease in the volume of air so that there is no decrease in the velocity of the falling water due to the compression of the air. Thus, as the volume of the entrained air and water decreases with the compression of the air, the volume of the pipe 1160 decreases so that the velocity of the falling water does not decrease.

The water and compressed air flows from the pipe outlet 1164 into the separator chamber 1126. The compressed air rises to the top of the chamber 1126 above the surface 1144 of the water and flows out of the chamber 1126 through a pipe or conduit 1180. The conduit 1180 may extend to any appropriate location, device, storage facility, etc., all as discussed in detail above along with the other embodiments shown in any of the Figures herein.

Again, it will be noted that a pump 1154 is used to pump water into the down tube or pipe 1160. With the water discharged in the separator chamber 1126, the water is then recirculated. Thus, there is essentially a closed system again disclosed in FIG. 11. Similarly, the apparatus of FIG. 10 may also be considered as an essentially closed system since the water is returned to the bottom of the body of water from the separator chamber 1140 and is pumped from the body of water 1002 into the hydraulic air compressor apparatus 1010. The recirculation of the water essentially comprises or defines a closed system.

Figure 12:
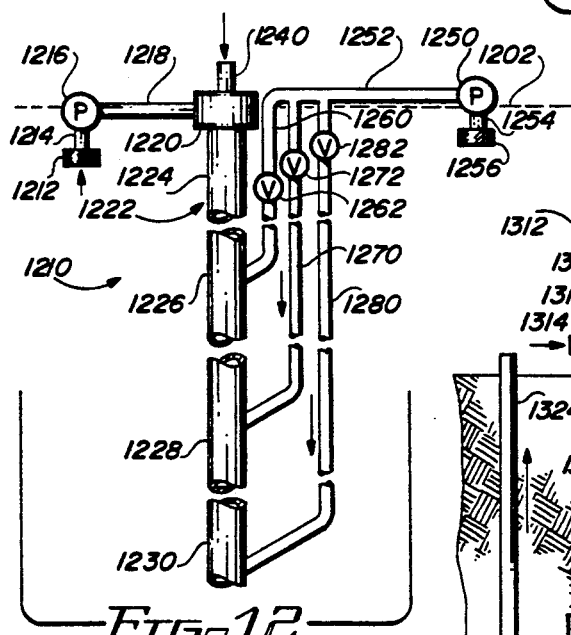
FIG. 12 is a schematic representation of another alternate embodiment of a hydraulic compressor.

An alternate embodiment of the apparatus illustrated in FIGS. 10 and 11 is shown in FIG. 12. FIG. 12 comprises a schematic side representation of an alternate embodiment of the hydraulic air compressor apparatus 1210 of FIGS. 10 and 11. The hydraulic air compressor apparatus 1210 of FIG. 12 provides the same general type of efficiency improvement that the apparatus of FIGS. 10 and 11 is designed to provide. That is, the velocity of the falling water does not decrease as the entrained air is compressed. Rather, additional water is introduced into the apparatus in place of the tapered down pipes illustrated in FIGS. 10 and 11.

The hydraulic air compressor apparatus 1210 includes a water filter 1212 through which water is pumped for the apparatus 1210. The water filter is connected to a pipe or conduit 1214 through which the filtered water flows. The water surface is denoted by reference numeral 1202. The pipe 1214 extends through the filter 1212 and a pump 1216. From the pump 1216, a pipe or conduit 1218 extends to an eductor portion 1220 of a down pipe 1222. The down pipe 1222 is generally cylindrical in configuration. That is, it has a substantially constant diameter. While the down pipes 1020 and 1160 of the hydraulic air compressor apparatus 1010 and 1110 of FIGS. 10 and 11, respectively, taper inwardly and downwardly to decrease the diameter of the pipe as the pipe moves downwardly to the respective separator chambers, the down pipe 1222 of the hydraulic air compressor 1210 has a substantially constant diameter.

An air intake pipe 1240 extends upwardly from the educator portion 1220. Air flows into the air intake pipe 1240 and is entrained in the water flowing into the eductor 1220 through the pipe 1218 from the pump 1216. If desired, an air pump or fan could be connected to the air intake pipe 1220 to increase the flow of air into the eductor portion 1220 and into the flow of water therethrough. The hydraulic air compressor apparatus 1010 and 1110 of FIGS. 10 and 11, respectively, illustrate the use of pumps or fans to increase the volume of air flowing. For simplicity, such an air pump or fan is not shown in FIG. 12.

A down pipe 1222 is illustrated as being divided into four portions, an upper or eductor portion 1224, a second portion 1226, a third portion 1228, and a fourth or lower portion 1230. Each separate down pipe portion includes its own water supply. The upper or eductor portion 1224 receives its supply of water directly from the pipe 1218 and the pump 1216. For the lower portions 1226, 1228, and 1230, separate piping units or elements are illustrated.

A pump 1250 is shown connected to a pipe 1252. The pump 1250 is connected to conduit 1852 which acts as or comprises a manifold or header for three pipes. The pump is also connected to an intake pipe or conduit 1254. The pipe 1254 receives water through a filter 1256. There is a first pipe 1260 connected to the pipe or header 1252. A two-way valve 1262 is disposed in the pipe 1260. A second pipe 1270 is also connected to the pipe 1252. A two-way valve 1272 is disposed in the pipe 1270. Finally, a third pipe 1280 is also connected to the pipe 1252. A two-way valve 1282 is disposed in the pipe 1280.

The pipe 1260 extends to the second portion 1226 of the down pipe 1222. The pipe 1270 extends to the third portion 1228 of the down pipe 1222. The third pipe 1280 extends to the bottom portion 1230 of the down pipe 1222. The valves 1262, 1272, and 1282 in the pipes 1260, 1270, and 1280, respectively, are used to control the flow of the water to the respective down pipe portions.

The addition of supplemental water to the different portions of the down pipe 1222 compensates for the decrease in the volume of the air as the air is compressed. By increasing the amount of water in the pipes the velocity of the water does not decrease. The increase in the water in the down pipe 1222 prevents the water from slowing down to occupy the space vacated by the air as the air is compressed. Obviously, the number of supplemental water pipes required depends on several factors, primarily the overall length (height) of the pipe 1222 and the diameter of the pipe 1222.

The use of two-way valves 1262, 1272, and 1282 also allow their respective pipes to be open directly to the water in which the apparatus 1210 is disposed. Venturi action will allow water to flow into the supplemental water pipes as required to compensate for the decreasing volume of air. Accordingly, it may not be necessary to utilize the pump 1250 to provide the supplemental water. Rather, once the hydraulic air compressor 1210 is operating with water flow in the down pipe 1222, venturi action may provide the supplemental water required to prevent a decrease in water velocity.

Thus, rather than have a decreasing cross-sectional area of the pipe 1222 as the pipe descends from the air entrainment or eductor portion 1224, the cross sectional area of the down pipe 1222 remains substantially constant. The amount of water in the pipe 1222 increases with supplemental flows of water being added as needed. Obviously, the amount of water that must be added varies with the initial flow of water and the amount of air entrained in the particular flow of water. Hence, valves are used in the supplemental water supply pipes for controlling the extra water flow.

It will be noted that no separator chamber is shown in FIG. 12 and no compressed air pipe is shown. Those elements may be of any appropriate design. Moreover, the embodiment of FIG. 12 may be used in a closed cycle system, such as shown in FIGS. 10 or 11, etc., or in an open cycle system, such as shown in FIG. 1 where the water is discharged through the dam.

It will be appreciated that the hydraulic air compressor apparatus 1210 may be less expensive than the apparatus shown in FIGS. 10 and 11 due to the expense of manufacturing the tapering down pipes used in the latter two embodiments, even though more piping and valving is required in the embodiment of FIG. 12. However, all three embodiments provide hydraulic air compressor apparatus having increased efficiency over traditional prior art hydraulic air compressor apparatus by preventing the decrease in the velocity of the falling water in the down pipes.

With traditional hydraulic air compressors, compression of the air does not start until the point or top or effective height of the water-out tube is reached. In FIG. 1, the top of the water-out tube is essentially the top of the water. Thus, the full length of the down tube or pipe 70 is used to compress the air. When the water is returned to the lake through either the pipe 94 or the pipe 95, the top of the lake is still the top of the compression head.

Between the point of the water-out tube and where the water and air are put in is the height of the entrainment head. Each thirty-four feet of compression head is the equivalent of about one atmosphere of pressure. Accordingly, if the entrainment head can be substantially eliminated, the efficiency of the apparatus will be increased by the additional compression head. When entrainment and compression can start at the same time, increased efficiency of the apparatus is obvious. In the apparatus of the present invention, the use of a pump allows a hydraulic air compressor to be installed virtually anywhere.

Moreover, as has been discussed in detail above, the use of the pump allows water to be circulated in a closed system. The prior art hydraulic air compressors are all of the open system type where water falls naturally into an entrainment head. The use of a pump to pump water into a down-tube also allows a hydraulic air compressor to be located behind a dam, as shown in FIG. 2.

The use of a pump or fan to increase the air flow is similarly not suggested in the traditional prior art hydraulic air compressors. The prior art uses "natural" air entrainment which is relatively inefficient. The embodiments of FIGS. 10 and 11 utilize air pumps or fans to increase the air flow into the water. It has been found that with the pumping of air, the amount of air entrained in water may be increased by about fifty percent over the "natural" air entrainment. Accordingly, for any given system, utilizing compressed air as the determining factor, the amount of water pumped can be substantially decreased, to provide the same net output of compressed air. There is accordingly a gain in energy and a decrease in cost. On the other hand, given a fixed amount of water pumped, the amount of air in the water may be increased by about fifty percent, again increasing substantially the output from a hydraulic air compressor.

Figure 14:
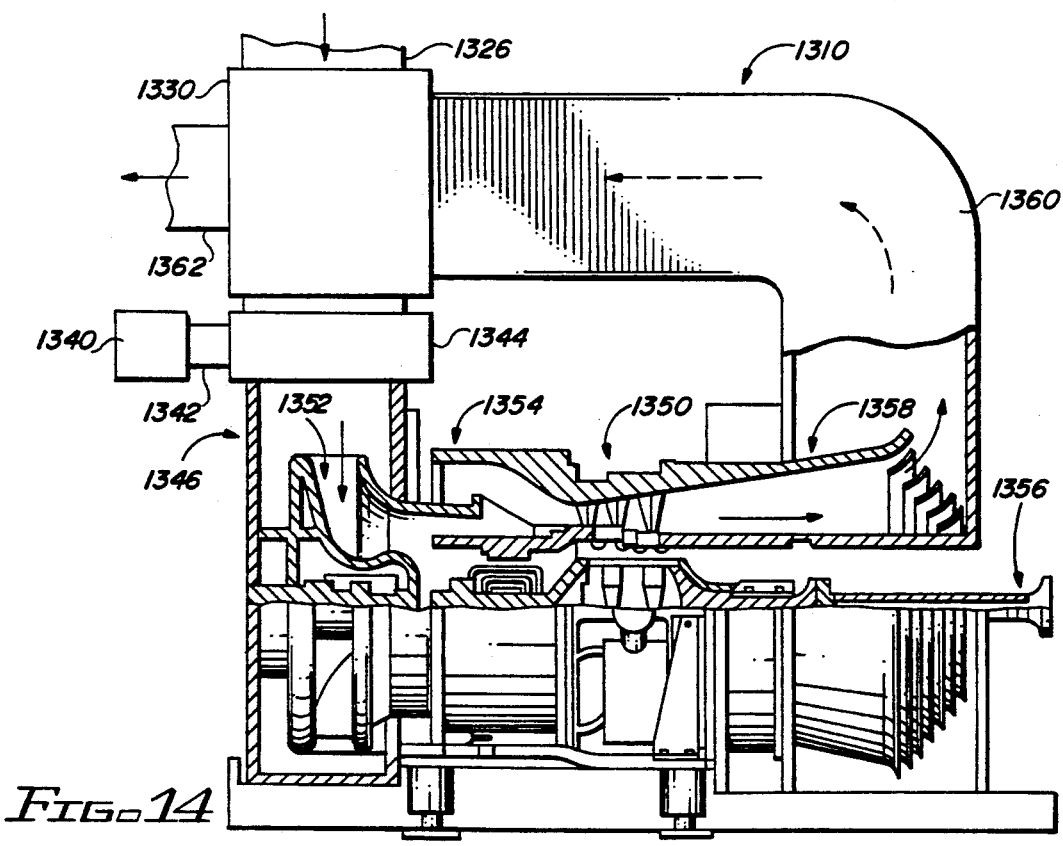
FIG. 14 is a side view schematically representing a portion of the apparatus of FIG. 13.
Figure 13:
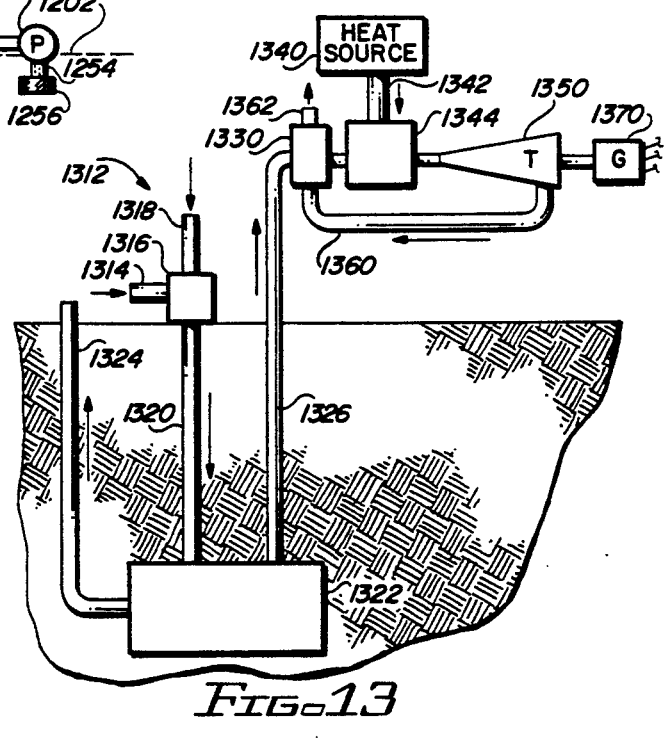
FIG. 13 is a schematic representation of another alternate embodiment of the apparatus of the present invention.

FIG. 13 is a schematic representation of an alternate embodiment 1310 of a hydraulic air compressor and turbine system. FIG. 14 is a side schematic representation of a portion of the system 1310 of FIG. 13. For the following discussion, reference will primarily be directed to FIGS. 13 and 14.

In FIG. 13, the hydraulic air compressor and turbine system 1310 is illustrated. The system includes a hydraulic air compressor 1312, and the hydraulic air compressor includes a water-in conduit or pipe 1314 extending to a eductor system 1316. An air-in pipe 1318 also extends to the eductor 1316. Below the eductor 1316, a down pipe 1320 extends to a separator chamber 1322. The water flowing into the eductor 1316 from the pipe 1314 entrains the air flowing through the pipe 1318 and the entrained air and water fall through the tube 1320 to the separator chamber 1322.

A water-up pipe or conduit extends upwardly from the separator chamber 1322. The water flowing upwardly from the pipe 1324 may be recirculated in a closed system, as shown in some of the above discussed embodiments. Obviously, the use of a pump, such as shown in FIGS. 1, 2, 10, 11, 12, etc., may be used for recirculating the water in a closed system. Similarly, a pump or fan may be connected to the air intake pipe 1314 to increase the volume of air flowing to the eductor 1314 and into the water also flowing thereto. A compressed air pipe 1326 extends from the separator chamber 1322 to a heat exchange unit 1330. From the heat exchanger 1330, the heated air flows to a second heat exchanger 1344. The second heat exchanger 1344 is connected to a primary heat source 1340 by duct work 1342. The compressed and heated air flows from the heat exchanger 1344 to a turbine 1350.

As best shown in FIG. 14, the turbine 1350 includes turbine inlet section 1352. The turbine inlet section 1352 is connected to the heat exchanger 1344 by appropriate ducting 1346. The turbine inlet section 1352 includes guide vanes which change the direction of the heated and compressed air and which conduct the air directly to a turbine section 1354. In the turbine apparatus 1350, there are no compressor sections and no combustion sections. The turbine apparatus 1350 accordingly operates without combustion and without compression, and relies solely on the compressed and heated air for the turbine section 1354.

The turbine section 1354 is connected to an output shaft 1356, and the output shaft 1346 is in turn connected to a generator 1370. (See FIG. 13.) Appropriate electrical distribution lines, etc., are connected to the generator 1370.

Also connected to the turbine section 1344 is an exhaust section 1358. From the exhaust section 1358, ducting 1360 extends to the heat exchanger 1330. From the heat exchanger 1330, the cooled air is exhausted through a duct 1362.

The heat source 1340 may be any appropriate source of high temperature heat, such a nuclear energy, solar energy, appropriate external combustion source utilizing gas or any other appropriate fuel, or the like. The term "external combustion" simply indicates that the combustion does not take place in the turbine 1350, but rather takes place externally of the turbine 1350 and the heat produced by the combustion is used substantially entirely to provide heat to the compressed air from the hydraulic air compressor apparatus 1312 from the pipe 1326.

The heat source 1340 provides the necessary heat to raise the temperature of the compressed air flowing from the hydraulic air compressor apparatus 1312 in the pipe 1326 to the heat exchanger 1330 to raise the temperature to that sufficient to operate the turbine apparatus 1350.

Utilizing a closed system hydraulic air compressor, as discussed above, and utilizing the increased efficiency of air being pumped into the hydraulic air compressor apparatus, and utilizing a heat source 1340 capable of increasing the temperature and pressure of the incoming air, the use of a fuel fired turbine is rendered unnecessary. Rather, the turbine apparatus 1340 will be operated without the need for internal combustion. Obviously, a suitable type of heat source 1340 is nuclear energy, but other heat sources may also be utilized.

It will be noted that two types of input heat or forms of input heat are used in the system 1310. The regeneration or preheat using the exhaust from the turbine section 1354 is one type of heat, a secondary type of heat. The primary heat, from the heat source 1340, may be any appropriate source of heat, as discussed above. Nuclear energy is usable at any time, while solar heat is available only during the day. Or, a combination of solar heat by day and fossil fuel combustion by night may also be appropriate. Moreover, geothermal heat may be used. Geothermal heat, like nuclear energy heat, is usable any time, and is not dependent on day and night cycles, as is solar heat. In addition, the combustion of refuse may also be used as a primary heat source, either by itself or in combination with solar heat, or the like.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. As an example, and without limitation, it is obvious that various valves will be required, particularly in the air lines or conduits. Various types of electrical controls may be required, none of which have been shown or discussed. For some embodiments of the apparatus of the present invention, the hydraulic compressor could simply be installed in a hole in the ground, adjacent to a canal, a lake, etc. The appended claims are intended to cover and embrace any and all such modifications, within the limits only of the true spirit and scope of the invention.

What I claim is:

1. Hydraulic air compressor and turbine apparatus, comprising, in combination:
   pump means for providing a flow of water for compressing air;
   air means for providing air to be entrained in and compressed by the flow of water from the pump means;
   down-pipe means for transporting the water and entrained air, the down-pipe means tapering inwardly to decrease the cross sectional area for compensating for the compression of the air in the flow of water;
   separator means connected to the down-pipe means for separating the entrained and compressed air from the flow of water;
   discharge means for discharging water form the separator means;
   conduit means for conveying the compressed air from the separator means; and
   turbine means for combusting fuel and the compressed air and for providing an output in response to the combustion of the fuel and the compressed air from the conduit means, including
      an inlet means for receiving the compressed air from the conduit means,
      combustion means for receiving fuel and for receiving the compressed air from the air inlet means and for combusting the fuel and compressed air and for providing hot combustion gases from the combustion of the fuel and compressed air, and
      a turbine section for receiving the hot combustion gases and for providing an putput in response to the hot combustion gases.

2. The apparatus of claim 1 in which the turbine means further includes heat exchanger means for transferring heat from the hot combustion gases to the compressed air to heat the compressed air and to cool the hot combustion gases.

3. The apparatus of claim 1 in which the air means includes an eductor and an air intake disposed above the eductor and the pump means.

4. The apparatus of claim 1 in which the pump means includes a body of water from which the flow of water is taken.

5. The apparatus of claim 4 in which the discharge means extends out of the body of water.

6. The apparatus of claim 4 in which the discharge means discharges water from the separator means to the body of water.

7. The apparatus of claim 1 in which the fuel fired turbine means further includes compressor means for increasing the pressure of the compressed air from the separator means.

8. The apparatus of claim 1 which further includes compressed air storage means for storing compressed air and second conduit means through which the compressed air from the compressed air storage means flows to the fuel fired turbine means.

9. Hydraulic air compressor and turbine apparatus, comprising, in combination:
   pump means for providing a flow of water for compressing air;
   air means for providing air to the entrained in and compressed by the flow of water from the pump means;
   down-pipe means for transporting the water and entrained air, the down-pipe means tapering inwardly to decrease the cross-sectional area for compensating for the compression of the air in the flow of water;
   separator means connected to the down-pipe means for separating the entrained and compressed air form the flow of water;
   discharge means for discharging water from the separator means;
   conduit means for conveying the compressed air from the separator means;
   means for heating the compressed air; and
   turbine means for receiving the heated and compressed air and for providing an output in response to the heated and compressed air.

10. The apparatus of claim 9 in which the means for heating the compressed air includes a heat source remote from the turbine means.

11. The apparatus of claim 9 in which the means for heating the compressed air includes means for combusting a fuel.

12. Hydraulic air compressor apparatus, comprising, in combination:
   pump means for providing a flow of water from compressing air;
   air means for providing air to be entrained in and compressed by the flow of water form the pump means;
   down-pipe means for transporting the water and entrained air, the down-pipe means including an inwardly tapered pipe to compensate for the compression of the air;
   separator means connected to the down-pipe means for separating the entrained and compressed air from the flow of water;
   conduit means for conveying the compressed air from the separator means; and
   discharge means for discharging water from the separator means and for returning the discharged water to the pump means to define a closed cycle.

13. The apparatus of claim 12 in which the discharge means includes a body of water which receives the discharged water from the separator means and from which the pump means receives the flow of water.

14. Hydraulic air compressor apparatus, comprising, in combination:
   pump means for providing a flow of water for compressing air;
   air means for providing air to be entrained in and compressed by the flow of water from the pump means;
   down-pipe means for transporting the water to compress the air;
   means for entraining the air in the water to be compressed;
   separator means connected to the down-pipe means and disposed adjacent to the means for entraining the air in the water for separating the entrained and compressed air from the flow of water;
   conduit means for conveying the compressed air from the separator means; and
   discharge means for discharging water form the separator means and for returning the discharged water to the pump means to define a closed cycle.

15. The apparatus of claim 14 in which the air mean includes a conduit adjacent to the down-pipe means for transporting air to be compressed.

16. Hydraulic air compressor and turbine apparatus, comprising, in combination:
   pump means for providing a flow of water for compressing air;
   air means for providing air to be entrained in and compressed by the flow of water form the pump means;
   down-pipe means for transporting the water and entrained air, the down-pipe means including supplemental piping to provide supplemental water to compensate for the compression of the air in the flow of water;
   separator means connected to the down-pipe means for separating the entrained and compressed air from the flow of water;
   discharge means for discharging water from the separator means;
   conduit means for conveying the compressed air from the separator means; and
   turbine means for combusting fuel and the compressed air and for providing an output in response to the combustion of the fuel and the compressed air from the conduit means, including
   air inlet means for receiving the compressed air from the conduit means,
   combustion means for receiving fuel and for receiving the compressed air from the air inlet means and for combusting the fuel and compressed air and for providing hot combustion gases from the combustion of the fuel and compressed air; and
   a turbine section for receiving the hot combustion gases and for providing an input in response to the hot combustion gases.

17. Hydraulic air compressor and turbine apparatus, comprising, in combination:
   pump means for providing a flow of water for compressing air;
   air means for providing air to be entrained in and compressed by the flow of water from the pump means;
   down-pipe means for transporting the water and entrained air, the down-pipe means including supplemental piping to provide supplemental water to compensate for the compression of the air in the flow of water;
   separator means connected to the down-pipe means for separating the entrained and compressed air form the flow of water;
   discharge means for discharging water form the separator means;
   conduit means for conveying the compressed air from the separator means;
   means for heating the compressed air; and
   turbine means for receiving the heated and compressed air and for providing an output in response to the heated and compressed air.

18. Hydraulic air compressor apparatus, comprising, in combination:

pump means for providing a flow of water for compressing air;

air means for providing air to be entrained in and compressed by the flow of water from the pump means;

down-pipe means for transporting the water and entrained air;

the down-pipe means including means for supplementing the flow of water to compensate for the compression of the air;

separator means connected to the down-pipe means for separating the entrained and compressed air form the flow of water;

conduit means for conveying the compressed air from the separator means; and discharge means for discharging water from the separator means and for returning the discharged water to the pump means to defined a closed cycle.

* * * * *